(12) United States Patent
Ikeda et al.

(10) Patent No.: US 6,953,557 B1
(45) Date of Patent: Oct. 11, 2005

(54) PROCESS AND APPARATUS FOR TREATING SEMICONDUCTOR PRODUCTION EXHAUST GASES

(75) Inventors: Hiroshi Ikeda, Kanagawa (JP); Yasuhiro Kubota, Kanagawa (JP); Takashi Kyotani, Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/463,961

(22) PCT Filed: Oct. 15, 1998

(86) PCT No.: PCT/JP98/04666

§ 371 (c)(1),
(2), (4) Date: May 25, 2000

(87) PCT Pub. No.: WO99/20374

PCT Pub. Date: Apr. 29, 1999

(30) Foreign Application Priority Data

Oct. 17, 1997 (JP) .............................................. 9/299671

(51) Int. Cl.⁷ .............................. C01B 7/01; C01B 7/09; C01B 7/19; C01B 7/20; B01D 50/00
(52) U.S. Cl. ........................ 423/210; 422/169; 422/170; 422/171; 423/240 R; 423/241; 423/245.2
(58) Field of Search ................................. 422/168, 169, 422/177, 181, 170, 171; 423/210, 240 R, 245.1, 241, 245.2

(56) References Cited

U.S. PATENT DOCUMENTS

| 4,719,088 A | | 1/1988 | Itoh et al. .................... 422/106 |
| 4,990,317 A | * | 2/1991 | Mak et al. ................ 423/215.5 |
| 5,851,293 A | | 12/1998 | Lane et al. .................. 118/715 |
| 6,183,720 B1 | * | 2/2001 | Laederich et al. ....... 423/658.5 |

FOREIGN PATENT DOCUMENTS

| EP | 0 673 669 A2 | | 9/1995 |
| EP | 0 684 067 A1 | | 11/1995 |
| EP | 0 792 681 A1 | | 9/1997 |
| JP | 51-44744 | * | 9/1949 |
| JP | 53-22568 | | 8/1951 |
| JP | 36-24051 | | 12/1961 |
| JP | 40-15090 | | 7/1965 |
| JP | 43-13121 | | 6/1968 |
| JP | 62-125827 A | * | 6/1987 |
| JP | 3-242215 A | * | 10/1991 |
| JP | 06285332 A | | 10/1994 |
| JP | 7-148414 A | * | 6/1995 |
| JP | 8-57254 A | * | 3/1996 |
| JP | 8-309147 A | * | 11/1996 |
| JP | 09038463 A | | 2/1997 |

OTHER PUBLICATIONS

Kohl et al., *Gas Purification* 4th ed., Gulf Publishing Co. Houston Tx; ISBN 0–87201–314–6 ; pp. 2 and 3, 1985.*

* cited by examiner

Primary Examiner—Wayne A. Langel
(74) Attorney, Agent, or Firm—Oblon, Spivak, McClelland, Maier & Neustadt, P.C.

(57) ABSTRACT

A process and an apparatus for treating exhaust gases, comprising an aeration stirring tank (5) employing an aqueous alkaline liquid, and, as a posterior stage, a gas-liquid contact device (7) and/or a packed column (11). The apparatus can remove at the posterior stage harmful gases that the aeration stirring tank fails to remove, for example, water-soluble organic compounds such as ethanol, halogenated silicon compounds such as $SiCl_4$, and halogen gases such as $F_2$ and $Cl_2$. The process and apparatus are particularly suitable for purifying exhaust gases discharged from a semiconductor production device.

9 Claims, 4 Drawing Sheets

PROCESS AND APPARATUS FOR TREATING SEMICONDUCTOR PRODUCTION EXHAUST GASES

This application is a 371 of PCT/JP98/04666 filed Oct. 15, 1998.

FIELD TO WHICH THE INVENTION BELONGS

The present invention relates to a treatment of exhaust gases, and in particular, relates to a process and an apparatus for removing harmful components from exhaust gases discharged from a semiconductor production device.

PRIOR ARTS

In the present semiconductor production industry, $CF_4$, $CHF_3$, $C_2F_6$, $Cl_2$, HBr, HCl, $BCl_3$, $ClF_3$ and the like are employed in the processes of dry etching of silicon wafers and chamber cleaning, and tetraethoxysilane (hereinafter referred to as TEOS), $NH_3$, $SiH_2Cl_2$ and the like are employed in the CVD process of a silicon wafer. Exhaust gases of these processes include the above unreacted gases, as well as decomposition products such as $SiF_4$, $F_2$, HF, $SiCl_4$, $CH_3CHO$, $CH_3OH$ and $C_2H_5OH$ which exhaust gases cannot be discharged as they are and hence are discharged after harmful components are removed by a removing apparatus.

Removing apparatus are roughly classified into two types such as dry type apparatus employing a solid adsorbent and wet type apparatus employing a chemical liquid.

Conventional removing apparatus for semiconductor production exhaust gases have the following problems.
(In the Case of Dry Type Apparatus)

Generally, they can achieve a high treatment performance and can adjust the concentration of harmful components at the removal outlet to a low concentration acceptable for working circumstances, but have the following problems.
(1) It is necessary to replace a solid adsorbent by flesh one whenever it is exhausted, and hence, the running cost thereof is high.
(2) In the case of an exhaust gas containing a solid reaction product, blocking may occur at times.
(3) Since the used or exhausted adsorbent contains highly concentrated harmful components, the treatment of the adsorbent is time consuming and is very costly. In addition, due to a high concentration of the components, troubles such as heat generation may occur at times.
(In the Case of Wet Type Apparatus)

Generally, the running cost thereof is low, but they have the following problems.
(1) In the case of ordinary wet type apparatus, they have a low treatment performance, and it is hard to reduce the concentration of harmful components at the removal outlet to an acceptable level for working circumstances. Besides, there are a smaller number of components which can be treated.
(2) In the case of ordinary wet type apparatus, solid reaction products (e.g., $NH_4Cl$, $SiO_2$, $B_2O_3$) may be produced at a posterior stage of the apparatus which products may cause blocking.
(3) In the case of ordinary bubble columns, the exhaust gas in the inlet side comes to have a positive pressure and a high load may be exerted on a vacuum pump or the like installed at the upstream side.
(4) In the case of jet scrubber type apparatus, trouble may occur in which a gas is raised onto a solid product by a circulating pump.

Moreover, since these removing apparatus may be installed inside a clean room, restrictions such as the fact that they should not be a source of the contamination in the clean room are imposed.

SUMMARY OF THE INVENTION

It is the object of the present invention to solve the above problems and to provide a process and an apparatus for treating semiconductor production exhaust gases, characterized in that a high removal rate of harmful components from exhaust gases is maintained, blocking due to a solid product can be prevented, and the running cost is low.

According to one aspect of the present invention, a process for treating exhaust gases is provided, which process comprises a step of introducing exhaust gases into an aqueous alkaline liquid in an aeration stirring tank while stirring the aqueous alkaline liquid, and a step of further removing harmful gases from the gases discharged from the aeration stirring tank.

In the present invention, the above removal step preferably comprises a step of allowing the gases discharged from the aeration stirring tank to come into contact with an aqueous liquid. Or, the above removal step preferably comprises a step of introducing the gases which have been discharged from the aeration stirring tank into a packed column filled with treating agent. Alternatively, the above removing process preferably comprises a step of allowing the gases discharged from the aeration stirring tank to come into contact with an aqueous liquid, and a step of introducing the gases discharged from the aeration stirring tank into a packed column filled with a treating agent.

It is preferable that the above aqueous alkaline liquid is an aqueous solution containing no alkaline metal element and that the pH of said aqueous solution is from 7.1 to 10.

In addition, it is preferable that the gases discharged from the aeration stirring tank are transferred by a gas transfer device. As the gas transfer device, a gas suction device to be installed at the downstream of a gas-liquid contact device or a packed column can be exemplified. However, a fan may be installed as the gas transfer device at the upstream of the gas-liquid contact device or the packed column.

The process preferably comprises further a step of discharging exhaust gases from the semiconductor production apparatus, said exhaust gases being introduced into the above aqueous alkaline liquid in the above introduction step.

According to another aspect of the present invention, an apparatus for treating exhaust gases is provided, which comprises an aeration stirring tank for introducing exhaust gases into an aqueous alkaline liquid while stirring the aqueous alkaline liquid; and at least one of a gas-liquid contact device for allowing gases discharged from said aeration stirring device to come into contact with the aqueous liquid and a packed column filled with an agent for passing gases discharged from said aeration stirring device.

In the present invention, the apparatus preferably comprises said gas-liquid contact device. Or, in the present invention, the apparatus preferably has said packed column. Or the apparatus preferably comprises said gas-liquid contact device and said packed column.

In addition, the apparatus preferably comprises a gas transfer device for transferring gases which have passed through the aeration stirring tank.

Moreover, the apparatus preferably comprises a passage for introducing exhaust gases discharged from the semiconductor production apparatus into said aeration stirring tank.

According to the present invention, acid gases such as HCl and HF, organic silicon compounds such as tetraethoxy silicon, and inorganic halogen compounds such as $BCl_3$ and $SiCl_4$ can be removed in the aeration stirring tank.

Besides, in the present invention, harmful gases which have failed to be removed by the aeration stirring tank, for example, alkaline gases such as ammonia and amine, water-soluble organic compounds such as ethanol and acetoaldehyde, halogenated silicon compounds such as $SiCl_4$, and halogen gases such as $F_2$ and $Cl_2$ can be removed by the gas-liquid contact device or the packed column at a posterior stage. Very small amounts of acid gases such as HCl and HF may pass through the aqueous alkaline liquid at times, and such very small amounts of acid gases can also be removed at a posterior stage.

The gas-liquid contact device is particularly suitable for removing water-soluble organic compounds, acid gases and alkaline gases. On the other hand, the packed column filled with a treating agent is particularly suitable for removing halogenated silicon compounds and halogen gases.

The present invention does not intend to remove organic fluorine compounds such as $CF_4$, $CHF_3$ and $C_2F_4$. This is because these organic fluorine compounds are chemically stable and do not significantly affect semiconductor production.

According to the present invention, in the process for treating exhaust gases by allowing semiconductor production exhaust gases to come into contact with an alkaline solution, thereby removing harmful components, it is possible to conduct the bringing into contact of said exhaust gases with the alkaline solution in the aeration stirring tank, and allow the gases after contact to come into further contact with water, as well as, bring these gases into contact with the solution by gas suction at a posterior stage.

Moreover, according to the present invention, in the apparatus for treating exhaust gases by allowing semiconductor production exhaust gases to come into contact with an alkaline solution, thereby removing harmful components, it is possible to employ an aeration stirring tank for allowing the exhaust gases to come into contact with the alkaline solution and a gas-liquid contact device for allowing exhaust gases from the stirring tank to come into contact with water, and further install a gas suction device for sucking gases at a stage posterior to these devices.

In the present invention, exhaust gases can be contact with treating agent in a packed column filled brought into with the agent; In addition, the pH of said alkaline solution is preferably adjusted to from 7.1 to 10, in particular, from 8.0 to 9.5, employing an aqueous solution containing no alkaline metal elements such as an aqueous ammonia or amine.

PREFERRED EMBODIMENTS OF THE INVENTION

The present invention will be described below in detail by making reference to drawings.

Figure 1:
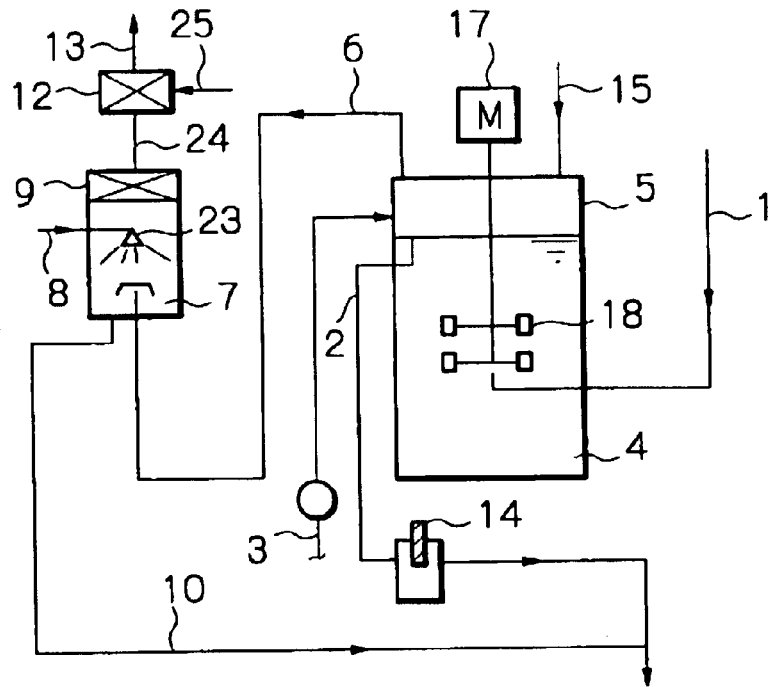
FIG. 1 is a diagram showing the whole constitution of an embodiment of a treating apparatus according to the present invention.
Figure 2:
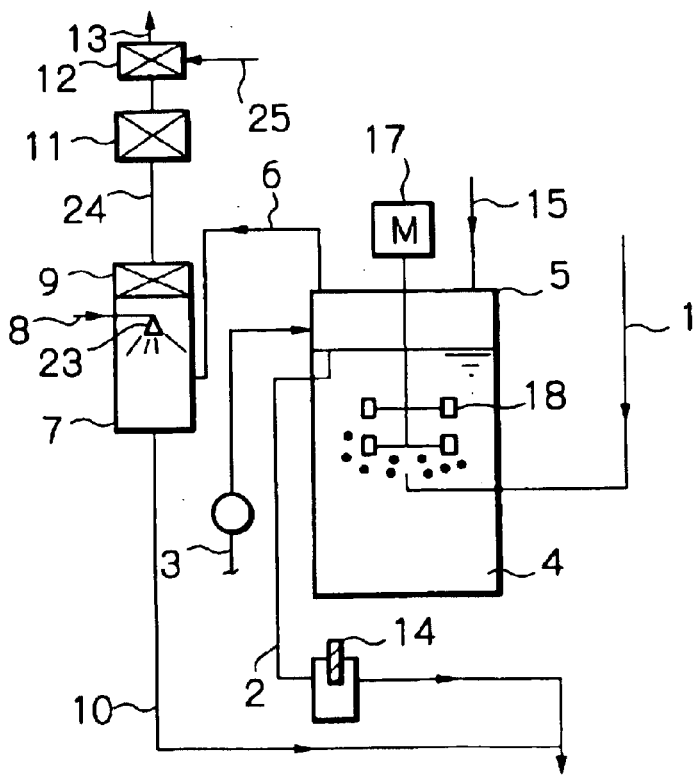
FIG. 2 is a diagram showing the whole constitution of another embodiment of a treating apparatus according to the present invention.
Figure 3:
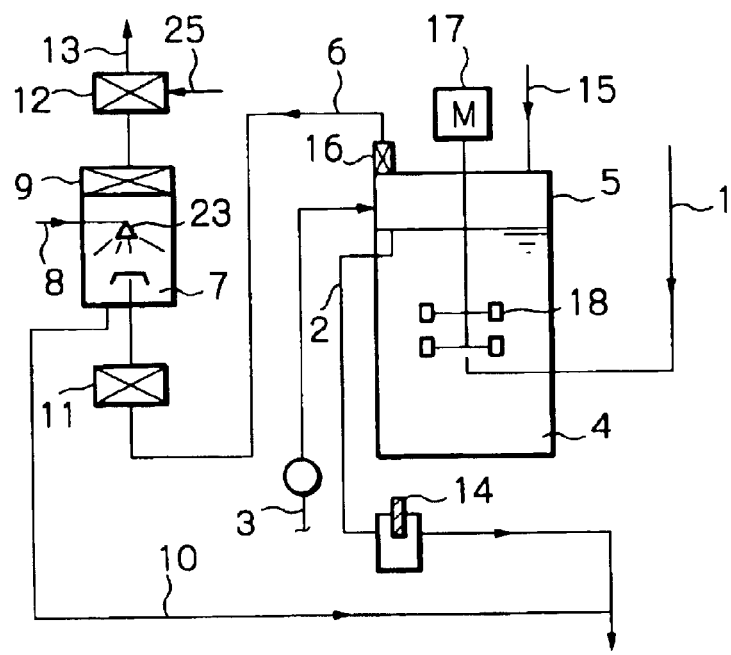
FIG. 3 is a whole constitution view showing still another embodiment of a treating apparatus according to the present invention.

Each of FIG. 1 to FIG. 3 shows a whole constitution diagram of an apparatus for treating semiconductor production exhaust gases according to the present invention. In FIG. 1 to FIG. 3, 1 shows a semiconductor production exhaust gas, 2 an overflow pipe, 3 an alkaline liquid, 4 a washing liquid (alkaline solution), 5 an aeration stirring tank, 6 an alkali-treated exhaust gas, 7 a gas-liquid contact device, 8 water, 9 and 16 a demister, 10 a drainage pipe, 11 a packed column, 12 a suction device, 13 a treated gas, 14 a pH measuring instrument, and 15 water.

First of all, the present invention will be described by making reference to FIG. 1.

FIG. 1 shows an example with no packed column provided therein; the semiconductor production exhaust gas 1 is, first of all, allowed to come into contact with the alkaline washing liquid 4 with a pH adjusted to from 7.1 to 10, preferably from 8.0 to 9.5, with the water 15 or the alkaline solution 3 in the aeration stirring tank 5. Here, the majority of components to be removed are absorbed in the washing liquid and removed.

The compounds are hydrolyzed in the aqueous alkaline liquid, for example, according to the following reaction:

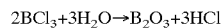

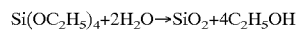

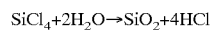

In addition, acid gases such as HF, HCl and HBr are absorbed in the aqueous alkaline liquid.

As the alkaline solution, aqueous solutions of ordinary alkaline materials can be employed; however, since alkaline metal elements such as Na and K contained in sodium hydroxide and potassium hydroxide act as harmful components in semiconductor production even in extremely small amounts thereof, it is preferable, if possible, to employ an alkaline liquid containing no alkaline metal elements such as ammonia, carbonates of ammonia, phosphates of ammonia and amine.

Figure 4A:
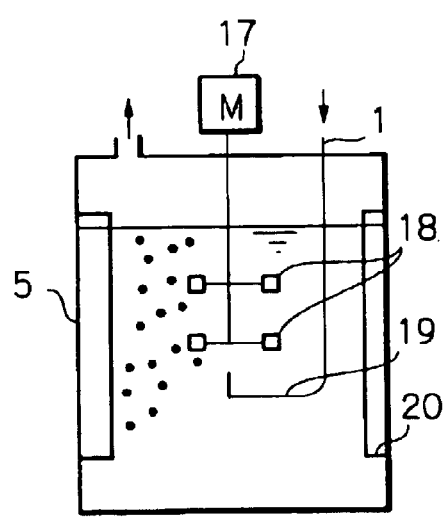
FIG. 4(a) and FIG. 4(b) are cross sections of an aeration stirring tank to be employed in the present invention.
Figure 4B:
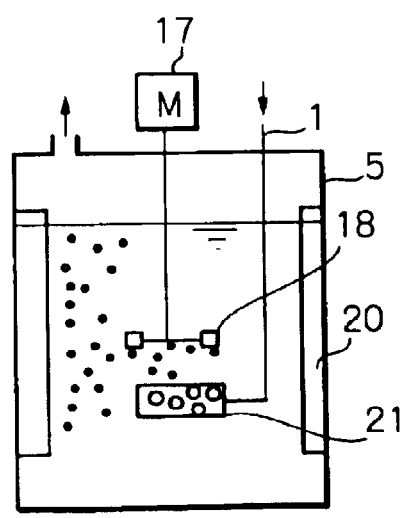

As the aeration stirring tank 5, tanks as illustrated in FIG. 4(a) and FIG. 4(b) can be employed. They disperse a gas by rotating a stirring blade at a high speed in a liquid. The aeration stirring tank preferably comprises a tank for retaining the alkaline liquid, a stirring means for stirring the alkaline liquid, and an exhaust gas introduction part for introducing the exhaust gas into the alkaline liquid. The stirring means comprises, for example, a motor, a shaft to be connected to the motor rotatably, and a blade attached to the shaft. The exhaust gas is introduced into the alkaline liquid from the outlet of the exhaust gas introduction part. The outlet of the exhaust gas introduction part is preferably near the blade of the stirring means.

In FIG. 4(a), FIG. 4(b), FIG. 5(a) and FIG. 5(b), 17 shows a motor, 18 a stirring blade, 19 a gas introduction direct pipe, 20 a baffle, 21 a porous pipe, 22 a filling, 22 a spray nozzle, 24 an exhaust gas washed with water, and 25 air.

FIG. 4(a) shows a device wherein the stirring blade 18 (disc turbine blade) with two or more right-angled turbine blades attached to the disc-like circumference, which is directly connected to the motor 17, is rotated in a liquid at a high speed, a gas is introduced by the direct pipe 19 from immediately below the stirring blade, and the gas is turned into fine foam by the shear force of the stirring blade to disperse the liquid; moreover, the stirring blade is preferably provided in two steps upward and downward and rotated at a high speed with a view to increasing the retention time of the foam in the liquid and the shear force of the stirring blade.

FIG. 4(b) shows a device wherein the stirring blade 18 (disc turbine blade), which is directly connected to the motor 17, and has several right-angled turbine blades attached to the disc-like circumference, is rotated in a liquid at a high speed, a gas in the form of fine bubbles is introduced by the porous pipe 21 from right below the stirring blade, and the gas is divided into finer foam by the shear force of the stirring blade provided right overhead to disperse the liquid. 20 shows a baffle.

The reason why the aeration stirring tank is employed in this way in the present invention will be described hereunder.

In the case of treating a high-concentration acid gas with an alkaline liquid in a liquid dispersion type wet absorption device such as a packed column generally and widely employed, a mist containing a salt produced by a neutralization reaction is formed. For example, when a HCl-containing gas is treated with ammonia water as a neutralization liquid, a mist containing $NH_4Cl$ is formed. Besides, when sodium hydroxide is employed as a neutralization liquid, a mist containing NaCl is formed. When $BCl_3$ and $SiF_4$ are wet-treated, a mist containing $B_2O_3$ or $SiO_2$ which is a hydrolyzed product thereof is formed. Since these products may be deposited at a stage posterior to the treatment device and cause trouble such as blocking, it is necessary to prevent their formation.

It is guessed that these mists are produced by a reaction of treatment object components with fine particles of a washing liquid present in the absorption device and components volatilizing from the washing liquid (for example, a water molecule and an ammonia molecule). In general, while the diffusion coefficient of a gaseous molecule is of the order of $10^{-5}$ $m^2/sec$, the diffusion coefficient of these mists is said to be of the order of $10^{-3}$ to $10^{-11}$ $m^2/sec$, and thus, the diffusion rate is extremely slow.

In general, in a wet absorption device, as a result of treating object components dissolved in a liquid, the concentration of the gas phase at the gas-liquid interface decreases, and a concentration gradient occurs in the gas phase nearby. The treatment object components are dispersed and transported by this concentration gradient, and the dissolution of the treatment object components into the liquid is accelerated. The transport amount by diffusion is in proportion to the diffusion coefficient of the treatment object components. However, since the diffusion coefficient of the mists are extraordinarily small in comparison with that of a gaseous molecule as described above, the transport amount by diffusion becomes extraordinarily small. Therefore, the dissolution rate of mist components into a liquid film is slow and sufficient removal performance cannot be obtained.

Hence, in order to sufficiently remove the resultant mists by the dissolution thereof into the liquid, it is necessary to accelerate the dissolution of the mists through a mechanism other than diffusion transport.

In the present invention, a device capable of obtaining a high removal performance is obtained by accelerating the renewal of a gas-liquid interface by finely dividing foam in a liquid by a stirring blade and accelerating dissolution by maintaining the mist concentration high in the gas phase at the gas-liquid interface.

Subsequently, since the gas 6 coming out of the aeration stirring tank 5 contains mainly treatment object components which have been failed to be removed, or ammonia and amine in the case of employing a volatile alkaline liquid, it is allowed to come into contact with water 8 in a suitable gas-liquid contact device 7, and then droplets are removed by the demister 9.

Figure 5A:
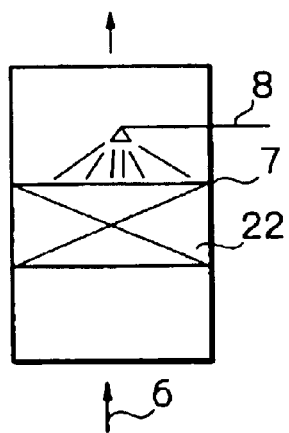
FIG. 5(a) and FIG. 5(b) are cross sections of a gas-liquid contact device to be employed in the present invention.
Figure 5B:
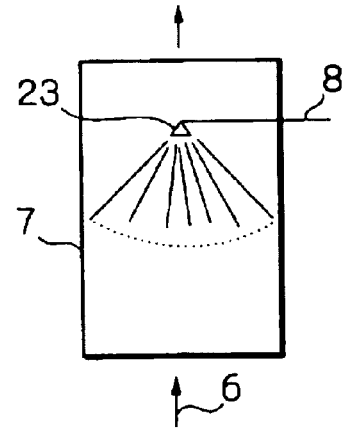

As the gas-liquid contact device to be employed here, any appropriate known device can be employed, and for example, those described in FIG. 5(a) and FIG. 5(b) may be employed.

FIG. 5(a) shows a packed column filled with a Raschig ring 22 in the inside thereof. Water 8 is sprayed from the upper part of the Raschig ring 22 onto the top of the filling, and the gas 6 is subjected to gas-liquid contact when it passes the filling zone.

FIG. 5(b) shows a shower column equipped inside thereof with a spray nozzle 23. Water 8 is sprayed in the form of a water film from the tip of the spray nozzle 23, and the gas is subjected to gas-liquid contact when it passes through the water film.

Water after subjected to the gas-liquid contact is discharged from the drainage pipe 10. Here, most of ammonia and amine are absorbed, and their concentration is reduced to an amount which is lower than the acceptable concentration for working circumstances.

The treated gas passes the suction device 12 and is discharged from the device as shown line 13. As an example of the suction device 12 an ejector type suction device can be employed, wherein high-pressure air or water is jetted from a nozzle and by suction force generated there, the pressure of the secondary side becomes negative; a fan and a water seal pump can also be employed.

The suction device is not an indispensable device, and the pressure of the primary side may be made positive instead of the pressure of the secondary side being made negative. For example, it is possible to provide a fan on the primary side and introduce a gas.

The washing liquid 4 is consumed by carrying out the treatment, and the removal efficiency thereof is decreasing. Hence, it is preferred that the pH is monitored by using a pH electrode 14, if necessary, and that the alkaline liquid 3 is injected into the washing liquid by an agent-injecting pump when the pH is lowered than the predetermined level.

In addition, reaction products of components in an exhaust gas with components in water or an alkaline liquid may be accumulated in a washing liquid to cause a decrease in a removal efficiency and the deposition of the products. Hence, it is preferable that the washing liquid is discharged from the overflow pipe 2 while adding a certain amount of water 15 to prevent the accumulation of the reaction products.

The aeration stirring tank 5 has been described above wherein a disc turbine type blade is rotated, a gas is dispersed by the shear force generated therefrom, the shear force is increased by providing blades on two upward and downward layers and the retention time of the gas in the washing liquid is extended. However, any stirring blade other than the above may be employed so far as it can provide a sufficient gas-liquid contact efficiency.

As the gas-liquid contact device 7, any types of the device may be employed provided that they can perform a sufficient gas-liquid contact efficiency, and the suction device 12 may be of any type other than the above so far as the pressure of the inlet exhaust gas 1 is constantly maintained negative.

In FIG. 2 and FIG. 3, the packed column 11 filled with an agent is added to the apparatus of FIG. 1; in FIG. 2, the packed column 11 is provided at a stage subsequent to the gas-liquid contact device 7, and in FIG. 3, the packed column 11 is provided at a stage prior to the gas-liquid contact device 7.

In FIG. 2, when treatment object components which have failed to be removed by the treatment of FIG. 1 remain, they are adsorbed to remove by the packed column 11 filled with an appropriate agent at a level below the acceptable concentration for working circumstances.

In FIG. 3, the gas 6 which has been subjected to droplet removal by the demister 16 after coming out of the aeration stirring tank 5 contains mainly treatment object components which remain unremoved, or contains ammonia, amine and the like when a volatile alkaline liquid is employed. Then, gas 6 is, first of all, allowed to pass the packed column 11 filled with an appropriate agent, and the treatment object components are adsorbed on the agent to be removed at a level below the acceptable concentration for working circumstances. Here, most of the treatment object components which have failed to be removed by the aeration stirring tank 5 are removed, but ammonia and amine may remain at times. Hence, the gas is then allowed to come into contact with water 8 in a suitable gas-liquid contact device 7, thereby ammonia and amine are almost absorbed in the water, and the treated gas passes the suction device 12 and is discharged from the device as shown by line 13.

Examples of the agent to be fed into the packed column include (A) activated carbons such as alkali-added activated carbons, (B) one or more metal oxides selected from oxides of metals such as Cu, Mn, Fe and Zn, (C) anion exchange resins, and (D) soda lime. (A) Alkali-added activated carbons are effective for removing $SiF_4$, $NO_2$, $Cl_2$ and $NH_4Cl$, and (B) metal oxides are effective for removing $SiF_4$, $NO_2$ and $NH_4Cl$. As the metal oxides, for example, Cu—Mn composite oxides and oxides of transition metals such as $Fe_2O_3$ can preferably be employed. (C) Anion exchange resins are effective for removing $SiF_4$, $Cl_2$ and $NH_4Cl$. Anion exchange resins may preferably have a quaternary ammonium group. In addition to anion exchange resins, cation exchange resins alone, or both cation exchange resins and anion exchange resins may be employed, if desired. As the soda lime, for example, powder of $Na_2CO_3$ covered with a NaOH coat can be employed.

Figure 6:
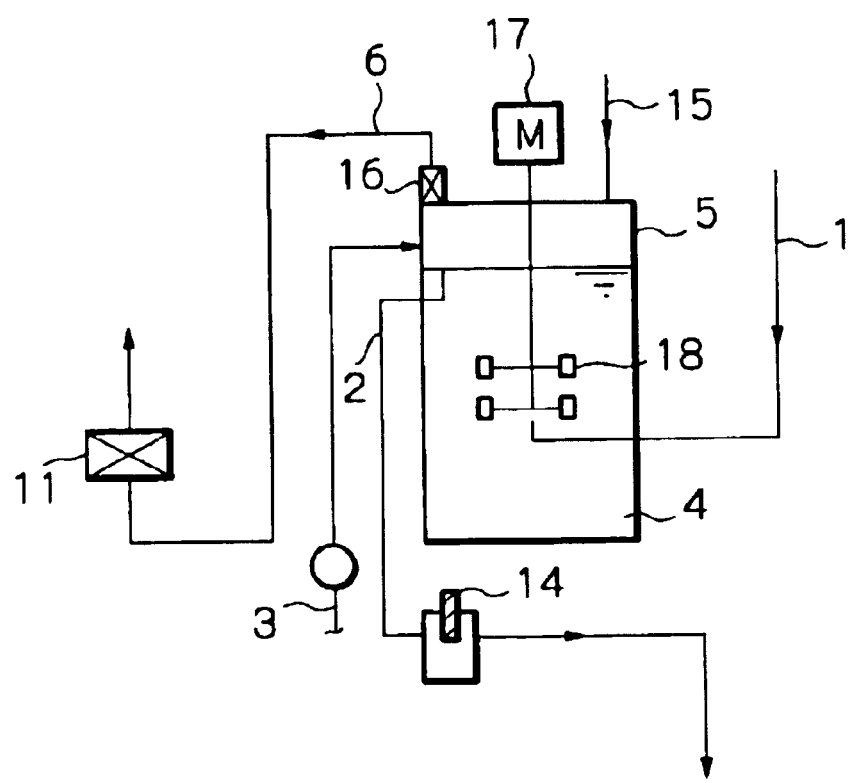
FIG. 6 is a diagram showing the whole constitution of another embodiment of a treating device according to the present invention.

FIG. 6 shows an apparatus comprising an aeration stirring tank 5 and a packed column 11 filled with an agent installed downstream in the tank. The apparatus of FIG. 6 has no gas-liquid contact device 7. In the apparatus of FIG. 6, the aeration stirring tank 5 may preferably employ an alkaline solution other than ammonia. This is because when employing the agent, the removal of ammonia may be limited. In the case of employing a suitable cation exchange resin in the packed column, however, ammonia can also be removed.

Halogenated silicon compounds such as $SiF_4$, and halogen gases such as $F_2$ and $Cl_2$ can be removed by the packed column filled with one of the agent.

As the packed column filled with the agent, a conventional packed column can be employed. For example, the packed column described in "Process for Removing Nitrogen Oxides in Exhaust Gases" of International Application PCT/JP98/01654, which was filed on Apr. 10, 1998, can be employed. In addition, the packed column described in "Process for Treating Exhaust Gases Containing Inorganic Halogenated Gases" of Japanese Patent Application No 10-168572, which was filed with the Japanese Patent Office on Jun. 16, 1998, can also be employed. The disclosure of International Application PCT/JP98/01653 and Japanese Patent Application No 10-168572 is incorporated in the present application by reference.

EXAMPLES

Hereunder, the present invention will be illustrated specifically by to examples.

Example 1

Employing a treating apparatus shown in FIG. 2, an exhaust gas discharged from an Al etching device for semiconductor production was treated. The flow rate of the semiconductor exhaust gas was 40 l/min.

The semiconductor exhaust gas 1 was, first of all, introduced into an aeration stirring tank 5 filled with water 4, the pH of which was adjusted to from 8.5 to 9.5 with the addition use of ammonia water 3. The introduced gas was then finely divided by a stirring blade 18 rotated with a motor 17 and came into contact with water 4. The rotation speed of the stirring blade 18 was set at 600 rpm. In order to prevent products from accumulating in the water 4, water 15 was introduced at a rate of 3 l/min into the aeration stirring tank, and the same amount of a blow-down drain 2 was drained. The pH of the blow-down drain was constantly monitored by a pH electrode 14, and the ammonia water 3 was injected when the pH was below 9.

The aeration stirring tank outlet gas 6 coming out of the aeration stirring tank was passed through water shower 7 sprayed from a spray nozzle 23 at a flow rate of 5 l/min, and allowed to come into contact with water 8. Water after contact was discharged as a water shower drain 10. A demister 9 was provided at the outlet of the water shower in order to prevent the sprayed water from the spray nozzle 23 from flying into subsequent stages. The water shower outlet gas 24 coming out of the water shower was introduced into the packed column 11 which had been filled with 10 l of an anion exchange resin. The packed column outlet gas coming out of the packed column was introduced into an air ejector 12 to be driven by air 25 and discharged as a treated gas 13. The amount of air 25 introduced was determined to 40 l/min.

The gas treatment was performed in an apparatus having the above constitution, and the semiconductor exhaust gas 1, the aeration stirring tank outlet gas 6, the water shower outlet gas 24 and the treated gas 13 were analyzed. The results are shown in Table 1.

For comparison, the same exhaust gas was treated by employing ammonia water for adjusting a pH, and a packed column type scrubber a Raschig ring as a filler. Other conditions were the same as those in Example. The results of the treatment are shown in Table.

TABLE 1

|  | 1) | 2) | 3) | 4) | 5) |
|---|---|---|---|---|---|
| $BCl_3$ (unit: ppm) | 5000 | <1 | <1 | <1 | <1 |
| $Cl_2$ (unit: ppm) | 3000 | 2 | 2 | <0.5 | 3 |
| $AlCl_3$ (unit: ppm) | 10 | <1 | <1 | <1 | <1 |
| $NH_3$ (unit: ppm) | <1 | 50 | <1 | <1 |  |
| $B_2O_3$ (mg/m$^3$) | <1 | 15 | 10 | <1 | 300 |
| $NH_4Cl$ (mg/m$^3$) | <1 | 20 | 15 | <1 | 400 |

1) Semiconductor exhaust gas 1
2) Aeration stirring tank outlet gas 6
3) Water shower outlet gas 24
4) Treated gas 13
5) Packed column type scrubber $BCl_3$, $Cl_2$ and $AlCl_3$ contained in the exhaust gas were treated at each stage, and thereby the concentration of each of these components in the treated gas was below a detection limit. Besides, components such as $NH_3$, $B_2O_3$ and $NH_4Cl$ generated during the process of the treatment were treated by the water shower and the adsorption column to lower the concentration below their detection limits.

In the case where the treatment was performed by the packed column scrubber, $B_2O_3$ and $NH_4Cl$ leaked by 300 mg/m$^3$ and 400 mg/m$^3$, respectively. In contrast, in the case of treatment by the aeration stirring tank, the leak concentrations of $B_2O_3$ and $NH_4Cl$ were 15 mg/m$^3$ and 20 mg/m$^3$, respectively, which are lower by one or more orders as compared with the case of the packed column scrubber.

Example 2

The treatment was conducted continuously for one month, and no trouble such as blocking in the apparatus due to solids contained in the semiconductor exhaust gas and heat release occurred. Moreover, the inside of the duct of the device outlet was checked after completion of the treatment, no adhesion of powders such as $B_2O_3$ and $NH_4Cl$ was observed.

Example 3

Changes in the inlet pressure of the apparatus when changing the flow rate of air 25 to be introduced into the air ejector 12 in the constitution as shown in Example 1 are shown in Table 2. As the amount of air introduced increases, the inlet pressure decreases; An introduction of 40 l/min achieved, an inlet pressure of −150 mmAq.

TABLE 2

| Flow rate of air introduced into air ejector (l/min) | Apparatus inlet pressure (mmAq) |
| --- | --- |
| 0 | +600 |
| 10 | +300 |
| 20 | +100 |
| 30 | −50 |
| 40 | −150 |

Example 4

By employing a treating apparatus shown in FIG. 3, a semiconductor exhaust gas discharged from an Al etching device for semiconductor production was treated. The flow rate of the exhaust gas was 120 l/min.

The semiconductor exhaust gas 1 was, first of all, introduced into an aeration stirring tank 5 filled with water 4, the pH of which was adjusted to from 8.5 to 9.5 with use of ammonia water 3. The introduced gas was then finely divided by a stirring blade 18 rotated with by a motor 17 and came into contact with water 4. The rotation speed of the stirring blade 18 was set at 600 rpm. In order to prevent the accumulation of the products in water 4, water 15 was introduced at a rate of 3 l/min into the aeration stirring tank, and the same amount of a blow-down drain 2 was drained. The pH of the blow-down drain was constantly monitored by a pH electrode 14, and the ammonia water 3 was injected when the pH became below 9.

The aeration stirring tank outlet gas 6 coming out of the aeration stirring tank was introduced into a packed column 11 which had been filled with 10l of an anion exchange resin. The packed column outlet gas coming out of the packed column was pass through water shower 7 sprayed from a spray nozzle 23 at a flow rate of 5 l/min and allowed to come into contact with water 8. Water after the contact was discharged as a water shower drain 10. A demister 9 was equipped at the outlet of the water shower in order to prevent from flying sprayed water from the spray nozzle 23 into subsequent stages. The water shower outlet gas 24 coming out of the water shower was introduced into an air ejector 12 to be driven by air 25 and discharged as a treated gas 13. The amount of the air 25 introduced was determined to 90 l/min.

The gas treatment was performed in an apparatus having the above constitution, and the semiconductor exhaust gas 1, the aeration stirring tank outlet gas 6, the packed column outlet gas and the treated gas 13 were analyzed. The results are shown in Table 3.

TABLE 3

|  | 1) | 2) | 3) | 4) |
| --- | --- | --- | --- | --- |
| $BCl_3$ (unit: ppm) | 5000 | <1 | <1 | <1 |
| $Cl_2$ (unit: ppm) | 3000 | 2 | <0.5 | <0.5 |
| $AlCl_3$ (unit: ppm) | 10 | <1 | <1 | <1 |
| $NH_3$ (unit: ppm) | <1 | 80 | 100 | <1 |
| $B_2O_3$ (unit: ppm) | <1 | 40 | 10 | <1 |
| $NH_4Cl$ (mg/m$^3$) | <1 | 80 | 15 | <1 |

1) Semiconductor exhaust gas 1
2) Aeration stirring tank outlet gas 6
3) Packed column outlet gas
4) Treated gas 13

$BCl_3$, $Cl_2$ and $AlCl_3$ contained in the exhaust gas were treated at each stage, and thereby the concentration of each of these components in the treated gas was reduced to a level lower than their detectable limits. Besides, components such as $NH_3$, $B_2O_3$ and $NH_4Cl$ generated during the process of the treatment were treated by the water shower and the packed column to lower the concentration below their detection limits.

According to the present invention, the following effects can be achieved.

(1) In the above treatment process, a reaction product of treatment object components with water or an alkaline liquid is prevented from leaking at subsequent stages by employing an aeration stirring tank at an initial stage, thereby troubles caused by the product can be reduced.

(2) The treating performance can be compared to that of a dry type treatment if a packed column is fitted at a subsequent stage.

(3) Since the majority of treatment object components are removed at a wet treatment stage even if a packed column is fitted, the packed column has a long-life and may be of a very small size. Therefore, time required for the replacement and running cost can remarkably be reduced.

(4) Since the amount of harmful materials to be condensed in the packed column is small, troubles such as heat generation do not occur easily, and the stabilization of the used agent presents no difficulties.

(5) Although the gas inlet pressure of the aeration stirring tank becomes positive, the load of a vacuum pump equipped at its upstream can be reduced if a suction device is placed at a subsequent stage.

What is claimed is:

1. A process for treating exhaust gases, the process comprising
a step of providing an aeration stirring tank having at least one baffle and a stirring device comprising a motor, a shaft rotatably connected to the motor, and a blade attached to the shaft;
a step of introducing exhaust gases into an aqueous alkaline liquid in said aeration stirring tank while stirring the aqueous alkaline liquid thereby turning the exhaust gases into fine foam by the shear force of the stirring blade to disperse the liquid; and a step of further removing harmful gases from the gases discharged from the aeration stirring tank.

2. The process according to claim 1, wherein said step of further removing comprises a process of allowing the gases discharged from the aeration stirring tank to come into contact with an aqueous liquid.

3. The process according to claim 1, wherein said step of further removing comprises a step of introducing the gases discharged from the aeration stirring tank into a packed column filled with an agent.

4. The process according to claim 1, wherein said step of further removing comprises a step of allowing the gases discharged from the aeration stirring tank to come into contact with an aqueous liquid, and a step of introducing the gases discharged from the aeration stirring tank into a packed column filled with an agent.

5. A process for treating exhaust gases according to claim 1, wherein said aqueous alkaline liquid is an aqueous solution containing no alkaline metal element and the pH of said aqueous alkaline solution is from 7.1 to 10.

6. A process for treating exhaust gases according to claim 1, further comprising a step of discharging exhaust gases from a semiconductor production device, said exhaust gases being introduced by the introduction step into the aqueous alkaline liquid.

7. The process according to claim 1, further comprising forming in the aeration stirring tank a foam comprising the exhaust gases and the aqueous alkaline liquid.

8. The process according to claim 7, further comprising stirring the foam with the blade.

9. An apparatus for treating exhaust gases, the apparatus comprising an aeration stirring tank for introducing exhaust gases into an aqueous alkaline liquid while stirring the aqueous alkaline liquid;

at least one device selected from the group consisting of a gas-liquid contact device for allowing gases discharged from said aeration stirring device to come into contact with an aqueous liquid, and a packed column filled with an agent for passing gases discharged from said aeration stirring device; and a gas transfer device for transferring to said at least one device gases which have passed through the aeration stirring tank; wherein said aeration stirring tank has at least one baffle and a stirring device comprising a motor, a shaft rotatably connected to the motor, and a blade attached to the shaft.

* * * * *

UNITED STATES PATENT AND TRADEMARK OFFICE
CERTIFICATE OF CORRECTION

PATENT NO. : 6,953,557 B1  Page 1 of 1
DATED : October 11, 2005
INVENTOR(S) : Ikeda et al.

It is certified that error appears in the above-identified patent and that said Letters Patent is hereby corrected as shown below:

<u>Title page,</u>
Item [86], should read:
-- PCT No.:     PCT/JP98/04666
   §371 (c)(1),
   (2), (4) Date:  Mar. 9, 2000 --.

Signed and Sealed this

Twenty-fifth Day of April, 2006

JON W. DUDAS
*Director of the United States Patent and Trademark Office*